United States Patent

[11] 3,592,527

| [72] | Inventors | Gary H. Conners;<br>Paul B. Mauer, both of 901 Elmgrove Road, Rochester, N.Y. 14650 |
|---|---|---|
| [21] | Appl. No. | 875,751 |
| [22] | Filed | Nov. 12, 1969 |
| [45] | Patented | July 13, 1971 |

[54] IMAGE DISPLAY DEVICE
14 Claims, 3 Drawing Figs.

| [52] | U.S. Cl. | 350/160 |
|---|---|---|
| [51] | Int. Cl. | G02f 1/28 |
| [50] | Field of Search | 350/160, 147; 40/130 |

[56] References Cited
UNITED STATES PATENTS

| 3,114,836 | 12/1963 | Fergason et al. | 250/83 |
| 3,499,112 | 3/1970 | Heilmeir et al. | 178/7.7 |

OTHER REFERENCES
B. Kazan, "Liquid Crystal Image Intensifier and Recorder," IBM TECH. DISCL. BUL. pp. 864 – 5 Vol. 12, 6 11/69

Primary Examiner—Ronald L. Wibert
Assistant Examiner—J. Rothenberg
Attorneys—Robert W Hampton and Gary D. Fields ABSTRACT: A display device utilizes a liquid crystal in a layered structure as a display screen. This structure includes in order a first transparent electrode, a photoconductive layer, a specular conductive mosaic layer, a liquid crystal layer and a second transparent electrode. The electrodes are connected to a DC source to provide an electric field therebetween. A radiation pattern to be displayed, is projected onto the photoconductive material through the first electrode rendering the photoconductive material conductive in exposed areas to cause a change in the degree of transparency of the liquid crystal film to form an image corresponding to the radiation pattern. This image can be viewed through the first electrode by ambient or artificial light reflected from the specular mosaic layer. To avoid undesirable reflections, a black background or a circular polarizer may be used.

If a nematic liquid crystal is used, the display is erased when the electric field is removed, whereas if a mixture of nematic and cholesteric materials is used, the image remains on the liquid crystal for a period of time after removal of the electric field.

GARY H. CONNERS
PAUL B. MAUER
INVENTORS

BY Gary D. Fields
Robert W. Hampton
ATTORNEYS

IMAGE DISPLAY DEVICE

BACKGROUND OF THE INVENTION

1. Field of the Invention

This invention relates to visual image display and more particularly to a device in which a liquid crystal layer is used to provide the display.

2. Description of the Prior Art

Toward the end of the 19th century F. Reinitzer and O. Lehmann independently observed that certain substances in passing from a solid crystalline state to an isotropic liquid state pass through a state or condition over a given temperature range wherein they display rheological properties similar to that of fluids, but have optical properties similar to that of the crystalline state. In order to identify these properties, Lehmann used the term "liquid crystal," which terminology persists today. Present thinking tends to regard substances which exhibit these properties as being in a fourth state of matter known as the mesomorphic state or mesophase since it is a state or phase intermediate that of the anisotropic crystal and that of the isotropic liquid.

There are three distinct mesomorphic states or forms, namely, the smectic mesophase, the nematic mesophase and the cholesteric mesophase. A nematic liquid crystal is essentially transparent, and therefore transmits light, but when placed in a DC electric field the molecules of some of these liquid crystals become disoriented so that the material diffuses light and becomes milky white in appearance. When the DC electric field is removed, the molecules of the liquid crystal return to their previous orientation so that the liquid crystal is again transparent. This phenomena is discussed in PROCEEDINGS OF THE I.E.E.E., for July 1968 in an article entitled: "Dynamic Scattering: A New Electro-optical Effect in Certain Classes of Nematic Liquid Crystals," by Heilmeier, Zanoni and Barton at pages 1162—1171.

The reflective optical storage effect of mixtures of cholesteric and nematic liquid crystal materials is discussed in a paper appearing in APPLIED PHYSICS LETTERS for Aug. 15, 1968 in an article entitled, "A New Electric Field Controlled Reflective Optical Storage Effect in Mixed-Liquid Crystal Systems," By Heilmeier and Goldmacher at pages 132 and 133, in which the authors describe how a mixture of nematic and cholesteric mesomorphic materials serve as an optical storage under a DC or low frequency AC electric field, which changes the initially transparent material to a milky white light-diffusing material. The liquid crystal material remains in the light-diffusing state upon removal of the DC field. The mixture can be rapidly erased or changed back to a transparent state by the application of a high frequency AC signal greater than 700 Hz.

U.S. Pat. No. 2,892,380 to Baumann et al. describes a schlieren-optical system for amplifying the light intensity of an optically projected image. A multiple layer control cell, consisting of a liquid crystal layer and a photoconductive layer, is bounded by a pair of electrodes which are connected to a DC source. The liquid crystal layer is a type which has an electric Kerr effect. A nonconducting mirror is arranged between the photoconductive and liquid crystal layers to provide optical isolation between a light image and a secondary light source. The light image is rastered on the photoconductive layer so that it becomes conductive in those areas where light strikes it. This produces a nonhomogeneous electric field between the electrodes corresponding to the light image which results in local variations in the index of refraction of the liquid crystal material corresponding to the light image. Light from a secondary source is reflected from the nonconducting mirror surface in accordance with the image pattern on the liquid crystal and is projected onto a screen to form a visible image. This device requires a separate viewing screen as well as a secondary light source.

An article appearing on pgs. 423-425 of the Aug., 1968 issue of The Glass Industry discloses the use of a conductive electrode coating on the liquid crystal which is scanned by a signal to produce an image.

SUMMARY OF THE INVENTION

This invention relates to a display device comprising a layered or sandwich structure which includes in order, a first transparent electrode, a photoconductive layer, a specular conductive mosaic layer, a nematic liquid crystal layer, and a second transparent electrode. The liquid crystal material used is one that is a mesophase at normal room temperatures or the material is maintained within the temperature range in which it is in the mesomorphic state during use. Means is provided for projecting a radiation pattern or image within a predetermined portion of the electromagnetic spectrum through the first transparent electrode onto the photoconductive layer. With a DC potential connected across the electrodes, a radiation pattern within the predetermined modulated electromagnetic energy range is projected through the first transparent electrode onto the photoconductive layer. The photoconductive layer then becomes conductive in the exposed areas to cause the nematic liquid crystal to diffuse light in corresponding areas. Thus, light projected onto the liquid crystal through the second transparent electrode will be reflected off of the specular mosaic layer in an imagewise manner to provide a visible image. To accomplish this, a black background is spaced from the device to absorb light which is reflected in the transparent areas. However, some of the diffused light reflects back to the eyes of the viewer forming an image corresponding to the projected radiation pattern.

In another embodiment of the invention the liquid crystal material is a mixture of nematic and cholesteric mesophases which provide a liquid display screen with an optical memory, wherein the liquid crystal retains its disrupted molecular orientation for a period of time to provide a viewable image even after removal of the electric field.

In another embodiment, the display screen combination is equipped with a circular polarizer means which provides the equivalent a black background, resulting in a simplified display screen configuration.

The advantages of this invention will become readily apparent when taken in conjunction with the accompanying drawings.

DESCRIPTION OF THE PREFERRED EMBODIMENTS

Figure 1:
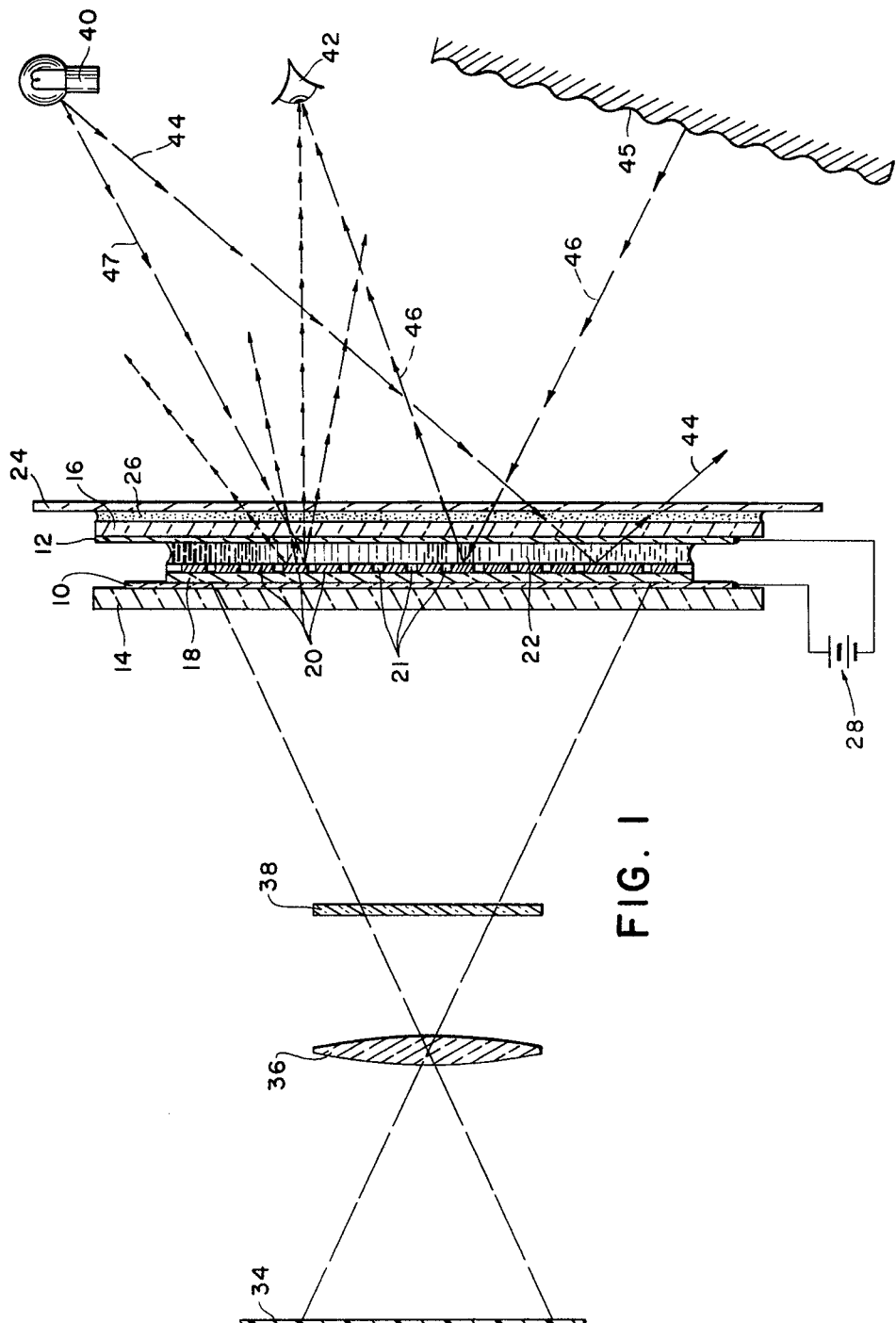
FIG. 1 is a schematic view of one embodiment of a liquid crystal display device in accordance with this invention utilizing a black background.

In FIG. 1, a pair of transparent electrodes 10 and 12, such as an electrically conducting thin layer of tin oxide, are deposited on carrier member 14 and 16 respectively, which members may be made of glass, plastic or other suitable transparent material. Photoconductive layer 18 is positioned with one side contiguous with transparent electrode 10, as shown. On the other side of photoconductive layer 18 is mounted a mosaic array of specular dots or patches 20 which may be made of metal or other conductive material. These patches reflect light which is forward scattered by the liquid crystal, as discussed below. The patches must be electrically insulated from each other to selectively change the optical characteristics of adjacent control layer such as liquid crystal 22 in accordance with the conductivity of photoconductive layer 18, as discussed more fully below. Conveniently the patches may be formed by coating photoconductive layer 18 with a nonspecular insulating layer 21, such as a photoresist, which is subsequently etched to leave spaces thereby forming a honeycomb structure. The conductive dots or patches 20 are placed on photoconductive layer 18 and within the spaces in insulating layer 21, as by vacuum deposition. For purposes of illustration, the patches have been shown as having substantial size. However, in actual practice the patches are very small dots which are small enough to give adequate image resolution. Also the spacing between patches is quite small. Photoconductive layer 18 may be selenium, germanium, zinc oxide, zinc sulfide, thallous sulfide, lead sulfide, silicon sulfide, cadmium sulfide, cadmium selenide or any of a number of organic photoconductive materials. These materials respond to light in the visible spectrum as well as other wavelengths in the spectrum such as infrared and ultraviolet.

Liquid crystal 22 is a nematic mesophase. A suitable nematic material is one comprising 80 mol percent of Butyl p-(p-ethoxyphenoxycarbonyl)-phenyl carbonate and 20 mol percent of p-[N-(p-methoxybenzylidene) amino] phenyl acetate. This material is a mesophase between 42° C. and 52° C. Another suitable material is made up ⅓ by weight of each of P-[(p-methoxybenzylidene) amino] phenyl acetate; P-(p-methoxybenzylidene) amino butyrate; and p-(p-butoxybenzylidene) amino acetate which is a mesophase between 25° C. and 55° C. Other suitable materials are listed on pp. 11—13 of Molecular Structure and the Properties of Liquid Crystals by G. W. Grey (1962). The liquid crystal layer can be on the order of 1 or 2 mils thick and can be supported by capillary action between specular surface 20 and transparent electrode 12. If desired means not shown, can be provided around the periphery of the liquid crystal to contain it. Also, if the material used is not a mesophase at the normal operating temperature of the display device, means, not shown, must be provided to maintain it within a temperature range wherein it is in the mesomorphic state. This might be accomplished with a radiant heating device directing heat onto the liquid crystal. An optical filter 24, such as an ultraviolet filter, can be secured by means of any convenient adhesive or cement 26 to the back side of the carrier member 16 for a purpose to be described. A DC voltage source 28 such as a battery, is connected to the electrodes 10, 12 as shown to provide the electric field therebetween. Advantageously, the liquid crystal serves as a viewing screen as described below.

The intelligence to be displayed on the nematic liquid crystal 22 is focused as a radiation pattern or image on the photoconductive layer 18 by means of an optical arrangement shown to the left as viewed in FIG. 1. A light source 30 projects light through a film or transparency 34, containing the intelligence to be displayed, and focuses the film image by means of lens 36 on photoconductive layer 18. As long as patches 20 and insulating layer 21 are opaque, light source 30 may have any spectrum range as long as the spectral sensitivity of photoconductive layer 18. However, if insulating layer 21 is transparent, ambient light used to illuminate liquid crystal 22 will pass through layer 21 and strike the photoconductive layer. If the photoconductive layer is sensitive to the ambient light it will become conductive in the areas adjacent layer 21 which in turn will vary the optical property of adjacent portions of liquid crystal 22 thereby destroying the integrity of the image to be viewed. To avoid this, a photoconductive layer may be used which has particular sensitivity in a portion of the electromagnetic spectrum, such as the ultraviolet region. A suitable photoconductive material is either poly-N-vinylcarbazole or triphenylamine dispersed in a vehicle such as polystyrene. In such a case source 30 is an ultraviolet light source and, if necessary, an ultraviolet transmitting filter 38, which passes ultraviolet and substantially blocks everything else, may be provided. On the other hand, optical filter 24 is an ultraviolet blocking filter that prevents any ultraviolet light in the ambient illumination from reaching the photoconductive material 18 from the liquid crystal side. Alternatively, insulating material 21 can be made opaque or of material which will block ultraviolet light. It has been found that a nematic mesophase such as liquid crystal 22 can be activated by current densities in the order of $2 \times 10^{17}$ amperes per square centimeter. Currents of this order can be produced by near ultraviolet light fluxes on the order of 5 ergs per square centimeter.

Prior to illumination, the electric field created by potential source 28 between electrodes 10 and 12 is substantially across only photoconductive layer 18 and little or no field exists across liquid crystal 22. This is because the photoconductive material is highly resistive in the dark and the liquid crystal is relatively conductive by comparison. With little or no electric field across the liquid crystal, it is essentially transparent. When an image of the information on film 34 is projected through lens 36 onto photoconductive layer 18, the photoconductive layer 18 becomes conductive in the illuminated portions so that an electric field is applied to corresponding portions of the liquid crystal. Ambient light, or light from a source 40 is then diffused or scattered in the areas to which the field is applied. Most of this light is forward scattered, i.e., it is scattered in the direction it is traveling.

Figure 2:
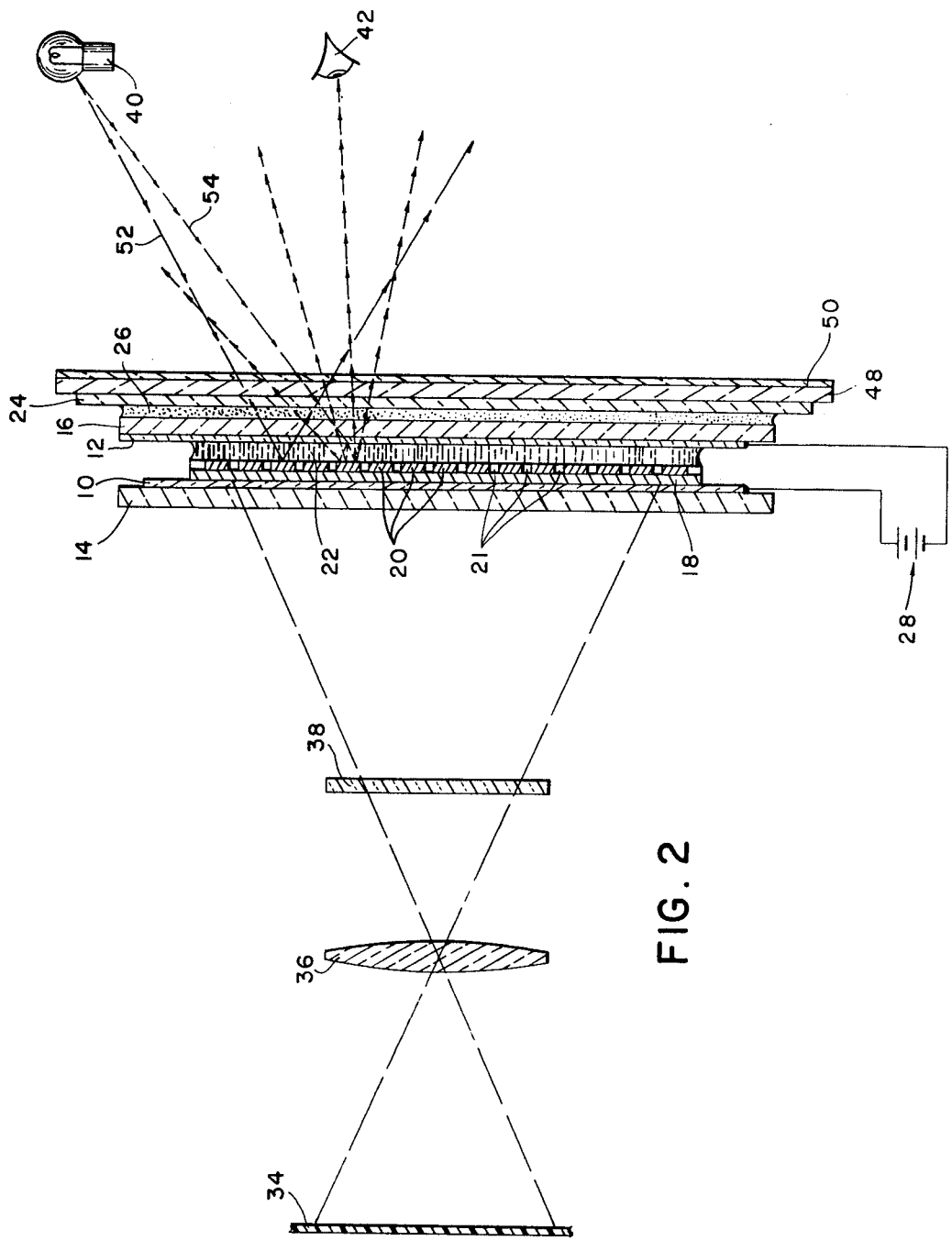
FIG. 2 is a schematic view of another embodiment of a liquid crystal display device with circular polarizer.

Therefore, it is necessary that a specular surface be provided in order to reflect some of the scattered or diffused light back to the eyes of the viewer. This is accomplished by means of the mosaic array of specular patches 20 which are positioned behind the liquid crystal 22 as shown. Light which strikes portions of the liquid crystal across which little or no electric field is applied is not scattered, but is transmitted directly to specular patches 20 and is reflected away from eye 42 of the viewer, as indicated by light ray 44. To avoid undesired reflections, a black background 45 is provided which is seen by reflection of light rays such as light ray 46 from the specular patches, as shown in FIG. 1. Thus, any ray of light which strikes a portion of liquid crystal 22 not subjected to electrical stress will be transmitted directly through this transparent portion of the liquid crystal and will be reflected off of one of specular patches 20. On the other hand a light ray, such as ray 47 which strikes a portion of liquid crystal 22 which is under electrical stress will be forward scattered so that it is reflected by a specular patch and further scattered as it passes back through the liquid crystal. At least a portion of this scattered light will reach the viewer's eye 42 so that he is able to view an image on the liquid crystal which is superimposed in the eye on the image of the black background. It will be noted that the viewed image will be the same as the image projected, i.e. a positive original will produce a positive image in the liquid crystal. In the embodiment of FIG. 2, the need for a black background is avoided by adding a quarter-wave plate 48 and a plane polarizer 50 to the display device as shown. The quarter wave plate 48 and the plane polarizer 50 together constitute a circular polarizer means which produce a black background effect. When a light ray, such as light ray 52, strikes the plane-polarizer-quarter-wave plate combination 48, 50, a circular polarized light beam will be produced. If this light beam strikes a portion of liquid crystal 22 and is circularly polarized in the opposite sense and, therefore, is blocked on return through plane-polarizer-quarter-wave plate combination so that no light from ray 52 strikes the viewer's eye 46. If, on the other hand, a light ray, such as ray 54, after being circularly polarized by plane-polarizer-quarter-wave combination 48, 50 strikes a portion of liquid crystal 22 which is under electrical stress, the light ray will be forward scattered by the liquid crystal. This scattered light will be reflected by a specular dot or patch 20 and further scattered as it passes back through the liquid crystal. This scattering will cause the light to be depolarized so that a portion of it passes through the plane-polarizer-quarter-wave combination and strikes the viewer's eye. Thus, a viewable image is on the display screen.

If certain nematic liquid crystals are mixed with certain cholesteric liquid crystals a liquid crystal is formed which has a memory, i.e., once the molecules of the crystal are arranged so as to provide a visual image to a viewer, they will remain in this orientation even after the electric field is removed. This memory will last up to several days, but the image on the crystal can be erased by subjecting it to a high frequency AC signal or a short pulse DC potential of opposite polarity to that of the initial DC field. A suitable liquid crystal having a memory is one composed of 90 percent by weight of anisylidene-p-aminophenylacetate (nematic range 82° C.—100° C.) and 10percent by weight of cholesteryl nonanoate (cholesteric range 78° C.—91° C.). Another suitable material is one composed 30 percent by weight of P-[(p-Methoxybenzylidene) amino] phenyl acetate; 30 percent by weight of p-(p-Methoxybenzylidene) amino butyrate; 30 percent by weight of p-(p-butoxybenzylidene) amino acetate and 10 percent by weight of cholesteryl oleyl carbonate. This material will be in the mesomorphic state in a temperature of 25° C. to 55° C.

Figure 3:
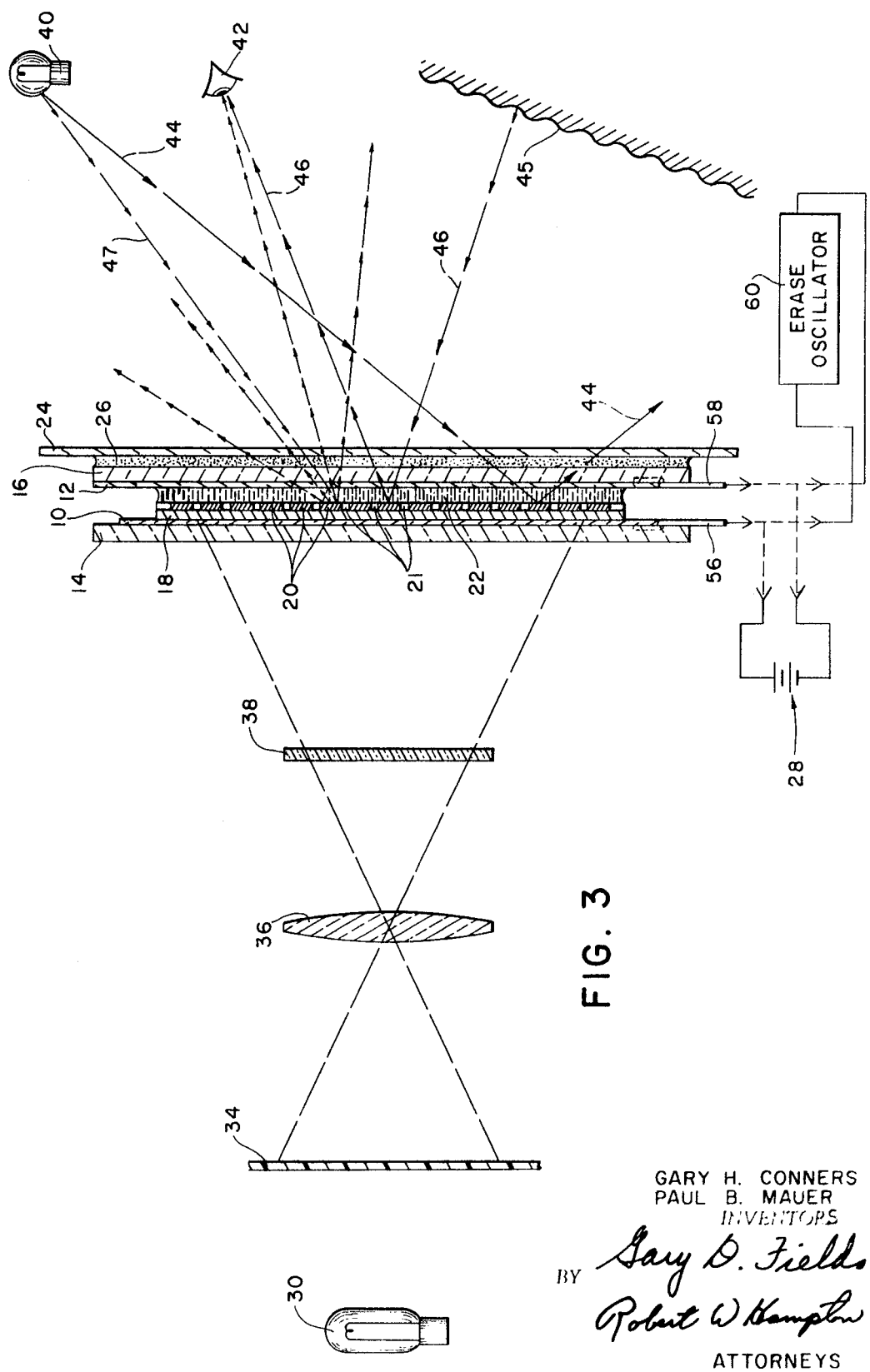
FIG. 3 is a schematic view of a further embodiment of a liquid crystal display device having a memory and means to erase an image.

A liquid crystal optical memory device is disclosed in FIG. 3. In this embodiment the transparent electrodes 10, 12 are provided with extension members or prongs 56 and 58 respectively. Conveniently, either a DC source 28 or a low frequency source, not shown, (below 100 Hz.) can be plugged into the prongs when an image is to be formed. An erase oscillator 60, preferably operating at a frequency above 700 Hz., can be plugged into the prongs when the image is to be erased.

The image on film 34 is projected to photoconductor 18 while DC voltage source 28 is connected across terminals 56 and 58 to form an image on liquid crystal 22 as discussed previously with respect to the other embodiments. The display device then can be disconnected from DC source 28 whereupon the optical pattern on liquid crystal 22 will persist for some time. When it is desired to erase the optical information, the memory device is connected to means, not shown, providing a short DC pulse of opposite polarity or to erase oscillator 60 which return the liquid material 22 to its quiescent or clear state. The memory device may be reused again by connecting it to DC source 28.

The invention has been described in detail with particular reference to preferred embodiments thereof, but it will be understood that variations and modifications can be effected within the spirit and scope of the invention.

We claim:

1. An image display device for displaying a projected radiation pattern by means of reflected ambient light, said device comprising:
    photoconductive means sensitive to a selected portion of the electromagnetic spectrum and having first and second sides, said first side being exposable to said radiation pattern within said selected portion of the electromagnetic spectrum to selectively increase conductivity of said photoconductive means in accordance with said pattern;
    a plurality of conductive specular means positioned on said second side of said photoconductive means in mosaic array for reflecting ambient light, said specular means being electrically insulated from each other;
    a liquid crystal layer which is transparent in areas not subjected to any substantial electric field but diffuses light in areas subjected to an electric field, said liquid crystal layer having first and second sides, the first side thereof overlying said specular means, said ambient light being transmittable through said liquid crystal layer from said second side to said first side to be reflected from said specular means;
    means for absorbing ambient light reflected by said specular means which ambient light passes through areas of said liquid crystal layer subjected to substantially no electric field;
    first and second transparent electrodes bounding, respectively, said first side of said photoconductive means and said second side of said liquid crystal layer;
    means for projecting a radiation pattern onto said first side of said photoconductive means;
    means for blocking ambient light from said photoconductive means; and
    means for applying a DC potential between said first and second electrodes to create an electric field having an intensity between said electrodes, the intensity of said field across said liquid crystal layer being greater in areas of said liquid crystal adjacent exposed areas of said photoconductive means than in areas adjacent unexposed portions of said photoconductive means so that said liquid crystal layer transmits and diffuses ambient light in accordance with said projected image whereby at least a portion of the diffused light is reflected by said specular means to provide a viewable image.

2. An image display device as claimed in claim 1 wherein:
    said specular means comprises closely spaced metallic patches.

3. An image display device as claimed in claim 1 wherein:
    said liquid crystal layer is a nematic mesophase.

4. An image display device as claimed in claim 1 wherein:
    said liquid crystal layer comprises a mixture of a nematic mesophase and a cholesteric mesophase.

5. An image display device as claimed in claim 1 wherein said ambient light blocking means includes:
    optical filter means interposed between the ambient illumination and said liquid crystal layer to block radiation falling within said selected portion of the electromagnetic spectrum.

6. An image display device as claimed in claim 1, further including:
    insulative means between said specular means to electrically insulate said specular means from each other.

7. An image display device as claimed in claim 6, wherein:
    said insulative means is opaque.

8. An image display device, as claimed in claim 1 wherein said ambient light absorbing means includes:
    black background means for absorbing ambient light reflected by said specular means which ambient light passes through transparent areas of said liquid crystal layer.

9. An image display device as claimed in claim 1 wherein said ambient light-absorbing means includes:
    circular polarizer means between said ambient light and said liquid crystal layer.

10. An image display device as claimed in claim 1 wherein said liquid crystal layer includes:
    a mesomorphic material which will remain in an image displaying condition after removal of said electric field thereacross.

11. An image display device as claimed in claim 10, further including:
    means for erasing an image from said liquid crystal layer.

12. An image display device for displaying an image wherein said image is viewed on a display screen by reflected ambient light, said device including:
    a display screen having a layered sandwich structure including in order:
        a first transparent electrode;
        a photoconductive layer;
        a layer of discrete, conductive specular elements for reflecting light which elements are electrically insulated from each other;
        a control layer which is substantially transparent in the absence of an electric field and scatters light under the influence of an electric field;
        a second transparent electrode;
    means for blocking ambient light from said photoconductive layer;
    means for applying a potential between said electrodes to create an electric field therebetween;
    means for absorbing light which is reflected from said specular elements without being scattered by said control layer;
    means for exposing said photoconductive layer to an original image to render said photoconductive layer more conductive in exposed areas to increase said electric field across corresponding portions of said control layer to selectively scatter ambient light striking said display screen so that it is reflected by said specular elements in an imagewise configuration.

13. An image display device as claimed in claim 12, wherein said layer of specular elements comprises: a metallic dot pattern.

14. An image display device as claimed in claim 12, wherein said control layer comprises: liquid crystal material.

PO-1050
(5/69)

UNITED STATES PATENT OFFICE
CERTIFICATE OF CORRECTION

Patent No. 3,592,527                    Dated   July 13, 1971

Inventor(s)  Gary H. Conners and Paul B. Mauer

It is certified that error appears in the above-identified patent and that said Letters Patent are hereby corrected as shown below:

In the heading, insert --Assignee:  Eastman Kodak Company
                                    Rochester, New York
                                    a corporation of New Jersey--.

Signed and sealed this 22nd day of February 1972.

(SEAL)
Attest:

EDWARD M. FLETCHER, JR.           ROBERT GOTTSCHALK
Attesting Officer                 Commissioner of Patents